United States Patent [19]
Pollard et al.

[11] Patent Number: 5,711,829
[45] Date of Patent: Jan. 27, 1998

[54] THREE-BELT TIRE

[75] Inventors: Andrew L. Pollard; Michel A. deReynal, both of Greenville, S.C.

[73] Assignee: Michelin Recherche et Technique S.A., Granges-Paccot, Switzerland

[21] Appl. No.: 585,255

[22] Filed: Mar. 27, 1995

Related U.S. Application Data

[63] Continuation of Ser. No. 935,686, Aug. 26, 1992, abandoned, which is a continuation-in-part of Ser. No. 587,416, Sep. 25, 1990, abandoned.

[51] Int. Cl.$^6$ .................. B60C 9/08; B60C 9/18; B60C 9/20; B60C 11/00
[52] U.S. Cl. .................. 152/209 R; 152/451; 152/526; 152/527; 152/532; 152/534; 152/536; 152/537; 152/538
[58] Field of Search .................. 152/451, 526, 152/527, 532, 534–537, 209 R, 450, 556, 538

[56] References Cited

U.S. PATENT DOCUMENTS

| | | | |
|---|---|---|---|
| 3,298,417 | 1/1967 | Keefe, Jr. | 152/527 X |
| 3,404,721 | 10/1968 | Massoubre . | |
| 3,504,724 | 4/1970 | Sperberg . | |
| 3,516,468 | 6/1970 | Jones | 152/534 X |
| 3,637,003 | 1/1972 | Clapson | 152/527 |
| 3,656,533 | 4/1972 | Barassi et al. | 152/534 X |
| 3,690,364 | 9/1972 | Barassi et al. | 152/534 X |
| 3,757,843 | 9/1973 | Carr | 152/534 X |
| 3,945,422 | 3/1976 | Pottinger | 152/534 X |
| 3,960,194 | 6/1976 | Neale | 152/559 |
| 4,016,916 | 4/1977 | Ravagnani | 152/534 |
| 4,170,255 | 10/1979 | Greiner et al. | 152/534 X |
| 4,284,117 | 8/1981 | Poque et al. | 152/536 X |
| 4,365,659 | 12/1982 | Yoshida et al. | 152/536 X |
| 4,407,346 | 10/1983 | Bandel et al. | 152/532 X |
| 4,454,903 | 6/1984 | Noel et al. . | |
| 4,850,412 | 7/1989 | Gupta | 152/556 |
| 5,000,239 | 3/1991 | Brayer et al. | 152/209 R |
| 5,058,646 | 10/1991 | Kajikawa et al. | 152/454 |
| 5,082,713 | 1/1992 | Gifford | 152/536 X |

FOREIGN PATENT DOCUMENTS

| | | | |
|---|---|---|---|
| 640997 | 5/1962 | Canada | 152/534 |
| 0248164 | 12/1987 | European Pat. Off. | 152/526 |
| 0350944 | 1/1990 | European Pat. Off. | 152/556 |
| 0356159 | 2/1990 | European Pat. Off. . | |
| 1260466 | 3/1961 | France | 152/534 |
| 2358998 | 2/1978 | France . | |
| 1189694 | 11/1985 | U.S.S.R. | 152/534 |
| 60-234003 | 11/1985 | Japan . | |
| 536133 | 5/1941 | United Kingdom . | |

OTHER PUBLICATIONS

*Mechanics of Pneumatic Tires*, ed. Samuel Clark:U.S. Department of Transportation, Aug. 1981, p. 131.
"Hyten™ Polyamide Monofilament", a Dupont brochure, p. 3. (As noted in 07/587,916, no date was available for this reference cited by applicants.).
"Hyten® Saves Weight In Tires", a DuPont brochure, Jun. 1989.
"Treating Tire Fabrics Of Hyten®", a DuPont brochure, Oct. 1989.
"Bridgestone Light Truck/Commercial" (sales brochure), 1990, pp. 18 and 20.
"Smithers Scientific Services, Inc. Tire Specification No. 7745-T", Sep. 28, 1990, 4 pp.

*Primary Examiner*—Adrienne C. Johnstone
*Attorney, Agent, or Firm*—Alan A. Csontos; Robert R. Reed

[57] ABSTRACT

The radial pneumatic passenger car tire of this invention has three belt plies. The inner and outer plies are constructed essentially the same having the same cord material disposed at an angle of approximately 15 to 20 degrees. The belt reinforcing members in the inner and outer plies can be of a textile cord material or preferably are of a nylon monofilament material. The middle ply of the three belt plies has reinforcing members at an opposed cord angle to the other plies of approximately −15 to −20 degrees. The middle ply is made with reinforcing members being either of textile cords or preferably metallic cables.

2 Claims, 4 Drawing Sheets

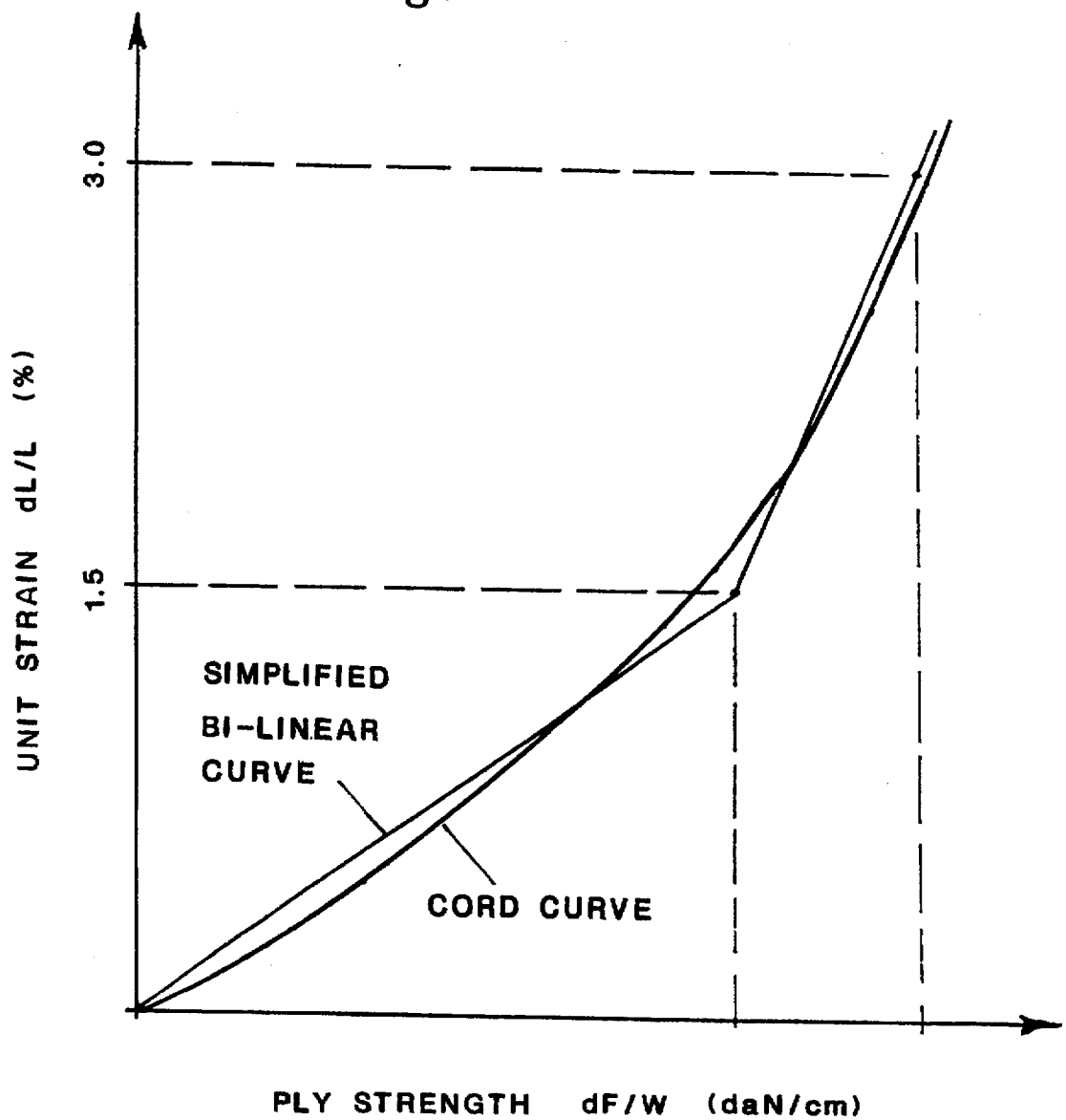

THREE-BELT TIRE

This is a continuation of prior application Ser. No. 07/935,686 filed on 26 Aug., 1992 now abandoned, which is a continuation-in-part of application Ser. No. 07/589,416 filed on 25 Sep., 1990 now abandoned.

TECHNICAL FIELD

The present invention relates to a pneumatic radial tire, and in particular to improvements in the crown belt reinforcement package as it relates to better tire performance for passenger cars.

BACKGROUND OF THE INVENTION

The radial passenger car tire produced for light to medium duty, at the time of this invention, classically has a belt reinforcing package comprising two belt plies of metallic cable with cable angles approximately 18 to 30 degrees from the equatorial plane of the tire. Cord angles are opposed in one belt ply with respect to the other belt ply in a crossing pattern. This conventional tire has a ply steer torque as a result of these cord angle that preloads the steering and suspension system of a vehicle. High shear stresses at the lateral edges of the belt package produce belt separations which shorten the life of the tire. An intra-ply wedge of rubber between plies at their lateral edges is commonly used to reduce the shear stress and improve the high speed endurance. The Japan Pat. No. 60-234003A disclosed adding two additional auxiliary belts with textile cords; one between the two belt reinforcement package and the carcass and the other between the two belt reinforcement package and the tread rubber. Cord angles in these auxiliary plies were 54 to 90 degrees and opposed in orientation. The disclosed utility of this patent was to check shear deformation inside the surface of the belt layer as well as to prevent lateral force in straight ahead running (due to ply steer). The same objectives are accomplished with the invention herein disclosed, but with a tire construction greatly simplified and at a reduced tire weight.

The proper use of materials is critical in the belt reinforcement package to insure adequate strength and endurance without increasing the tire mass or production complexity. Cord materials and their orientation, density and stiffness properties are very critical. Recent developments with monofilament textile cords show this cord materials to be superior in many performance areas. Polyester monofilaments have been disclosed as cords in the carcass in U.S. Pat. No. 3,963,678, having an elliptical shape as disclosed in U.S. Pat. No. 4,634,625. A composite cord or fiberglass and nylon monofilament was disclosed in U.S. Pat. No. 3,692,080 for use in the belt and/or carcass of bias-ply or radial tires. Polyamide (nylon) monofilament cords with an "obround" cross section were disclosed for use as carcass cords in U.S. Pat. No. 4,850,412, which is incorporated herein by reference thereto. The obround shape is devined as generally rectangular with rounded corners in this patent (Column 2 lines 53–68). This reference disclosed that a carcass reinforcement can be made with 20–40 percent less fiber and less rubber, and still out perform the conventional tire. The nylon monofilament is disclosed as being compatible with any kind of rubber suitable for tire applications, and essentially any pneumatic radial tire type or construction. The use of polyamide monofilament cords with an elliptical cross section for the carcass body plies is also disclosed in European Patent No. 0 356 159 A2. This nylon monofilament material with an "obround" profile is preferred material for the cords of the first and third plies of the belt reinforcing package of the three-belt tire disclosed in this invention.

Protection of the edge of the belt plies, to reduce the tendency for the end of the cables to separate, is classically provided in a variety of means. A typical means is to insert an intra-ply wedge to provide sufficient distance between the belts for the transition of shear stresses between plies. An alternative is to cover the edge of the metallic belt plies with narrow auxiliary plies of metallic cables or textile cords. The U.S. Pat. No. 3,404,721 discloses the use of polyamide multifilament cord in a narrow ply folded in a U-shape around the edges of the primary belt plies. The invention disclosed herein utilizes the first and third textile cord plies to protect the edge of the metallic cables in the second ply from separating.

The three-belt tire of U.S. Pat. No. 3,945,422 (Pottinger) also discloses the use of two inch wide nylon belt edge protection plies, as well as a variation in the width of the belt plies, to reduce the tendency of the steel corded belt plies to separate. The first innermost ply is disposed at 25 degrees and has a width of 6 inches where the third ply is disposed at the same 25 degree angle and has a width of 5.40 inches. The middle second ply has a width of 4.80 inches and is disposed at an angle of −25 degrees, opposite that for plies one and three. An essential claimed requirement of this U.S. Pat. No. 3,945,422 is that the second ply has a direction and stiffness which gives symmetrical stiffness relative to the thickness midplane of the belt package. That is, the stiffness of ply two is the same as the stiffness of ply one plus ply three. The stiffness parallel with the cords is disclosed as the effective "Elastic Modulus" of the ply in this patent and these terms are used interchangeably.

A tire having three or more steel belts is illustrated in French Patent No. 2358998. This patent for a large truck tire has a second or intermediate ply with at least a angle of 60 degrees with respect to the equatorial plane. Alternating strains at the edge of the belts are controlled by an essential feature of the three belts having width differences. The truck tire of this reference was characterized by reduced strains which allows the belt reinforcing package to have adequate endurance for repeated recapping.

Other companion or related art is disclosed in patents U.S. Pat. No. 2,884,040, U.S. Pat. No. 3,504,724, U.S. Pat. No. 4,464,903 and FR 2,409,871. The applicant considers this art related to those discussed above but each having a scope not as applicable as those discussed.

The above art shows that there is a need for a passenger car tire having a new belt package with improved endurance against the separation of belt plies without increasing tire mass and manufacturing costs associated with auxiliary belt plies or belt edge cover strips and complex intra-ply wedges. This should be accomplished without reductions in tire performance when compared with a standard Tire and Rim Association (T & RA) two steel belt radial pneumatic tire.

SUMMARY OF THE INVENTION

According to the current invention what is claimed is a design for a reinforcing belt package to be laid in a tire between the carcass and the tread. The reinforcing plies making up the reinforcing belt are laid so that the first and third plies are identical or approximately identical in material, angle, and uncured width. These plies are reinforced with multifilament or monofilament textile cables. The angles for the first and third plies are in a range to be specified later with respect to the equatorial plane of the tire.

Reinforcing ply two is posed with its angle crossing that of plies one and three, the angle for ply two is in a range to be specified later with respect to the equatorial plane of the tire. The material used for the second reinforcing ply can be metallic, textile multifilaments or monofilaments. The width of ply two is comprised between 95% and 105% of the rolling tread width and preferably equal to this width. The width of plies one and three are placed such that their edges extend beyond the edges of ply two by a distance comprised between 5 and 16 mm on the cured tire.

The reinforcing belt package formed by the superposition of the three crown plies is separated from the carcass ply or plies by a thin layer of rubber, (shoulder wedge) approximately 0.5 to 0.8 mm thick on the cured tire. This layer should extend laterally past the edges of the belt, but it can be interrupted under the central portion of the crown, for a width approximately equal to 50% of the belt width, by tapering its edge.

At 1.5% elongation, the ply strength of a fabric used for plies one and three should be at least 12.0 daN/cm and no greater than 50 daN/cm.

At 3.0% elongation, the ply strength of the fabric used for plies one and three should be at least 18.0 daN/cm and no greater than 70 daN/cm.

The angle used for plies one and three is in the range from 15 to 20 degrees with a equatorial plane of the tire.

At 1.5% elongation, the ply strength of a fabric used for ply two should be at least 30 daN/cm with no upper limit.

The angle used for ply two is in the range from 15 to 25 degrees with respect to the equatorial plane of the tire.

The preferred configuration for plies one and three is a nylon monofilament with a decitex from 4000 to 6000, treated with a conventional RFL (resorcinol-formaldehyde-latex) adhesive, using treatment conditions to give a free shrinkage of the cable from 1.5 to 2.0% at 180 degrees centigrade. These plies should be laid at an angle from 15–20 degrees with respect to the equatorial plane of the tire.

The elastomeric skim material used for the reinforcing plies is of a type conventionally used for crown reinforcing plies of either metallic or textile materials with the modulus in a range from 10–45 Megapascals when measured at 10% elongation. The level of modulus used for the reinforcing plies will be dependent on the level of performance desired for the particular application of said tire. The skim thickness for the reinforcing plies is dependent on the type of reinforcing materials used but should be sufficient as to give a layer of rubber from 0.1 mm to 0.25 mm on each of the top and bottom surfaces.

The preferred configuration for ply two is a steel cable covered with a conventional brass coating and posed at an angle from 15 to 25 degrees with respect to the equatorial plane of the tire. The angle of the belt being selected to give the optimum balance of parameters for a given tire design and dimension. The elastomeric skim material for the second reinforcing ply will be of a type conventionally used for steel plies in the crown of a tire. The skim covering for ply two can be the same as for plies one and three.

BRIEF DESCRIPTION OF THE DRAWINGS

One embodiment of the invention will now be described, by way of illustration and not of limitation, with reference to the accompanying drawings, in which:

FIG. 6 is a unit strain vs. ply strength curve for a nonlinear ply reinforcement cable or cord.

DETAILED DESCRIPTION AND PREFERRED EMBODIMENTS

Figure 1:
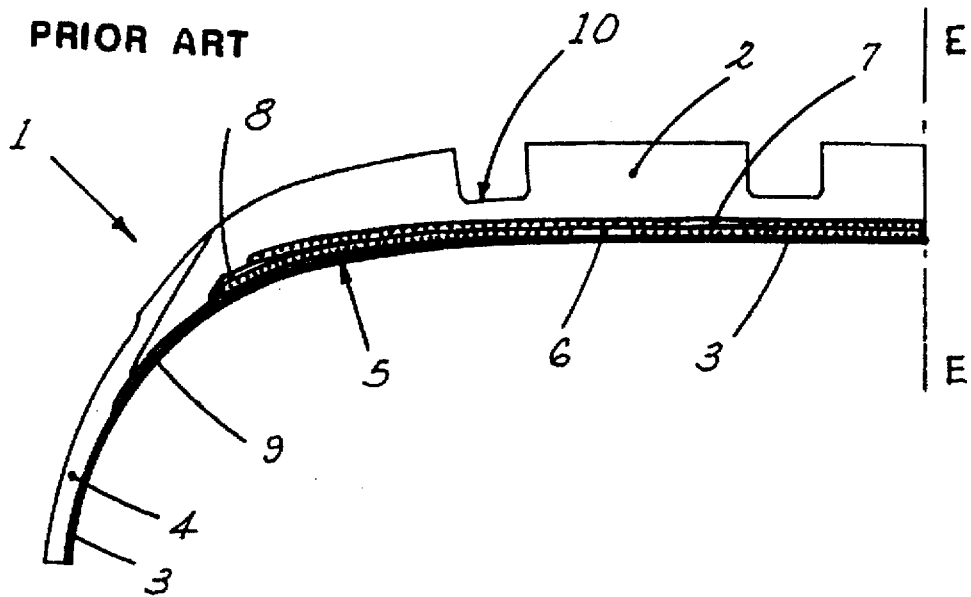
FIG. 1 is a prior art sectional view of the crown portion of a tire having a conventional two ply belt reinforcement package.

The conventional or witness tire 1 of FIG. 1 is symmetrical about the equatorial plane E—E and is typical state-of-the-art tire design for the summit area of a passenger car tire with nominal performance capabilities. The tire components shown comprise a tread 2, and a carcass 3, one sidewall 4, an impervious liner 5, a belt reinforcing package having a first ply 6 and a second ply 7, an intra-ply wedge 8 and a shoulder wedge 9. The bead area is not shown. The cords or cables in the second ply 7 are disposed at an angle opposite to the first ply 6 cord or cable angles. This belt package bias results in a ply steer torque that preloads the steering & suspension system of the vehicle. The intra-ply wedge 8 is used to transition the inter-ply shear stresses between belts 6 and 7 at their edge. These stresses can limit the speed and fatigue endurance of the conventional tire 1. Metallic cables are used in a majority of conventional tire designs for belt reinforcement. Sufficient thickness between the bottom of the tread groove 10 and the metallic cable is necessary to provide corrosion resistance due to objects penetrating the tread 2 rubber. This conventional tire 1 will be used to compare with the preferred embodiment tire 11 disclosed below.

Figure 2:
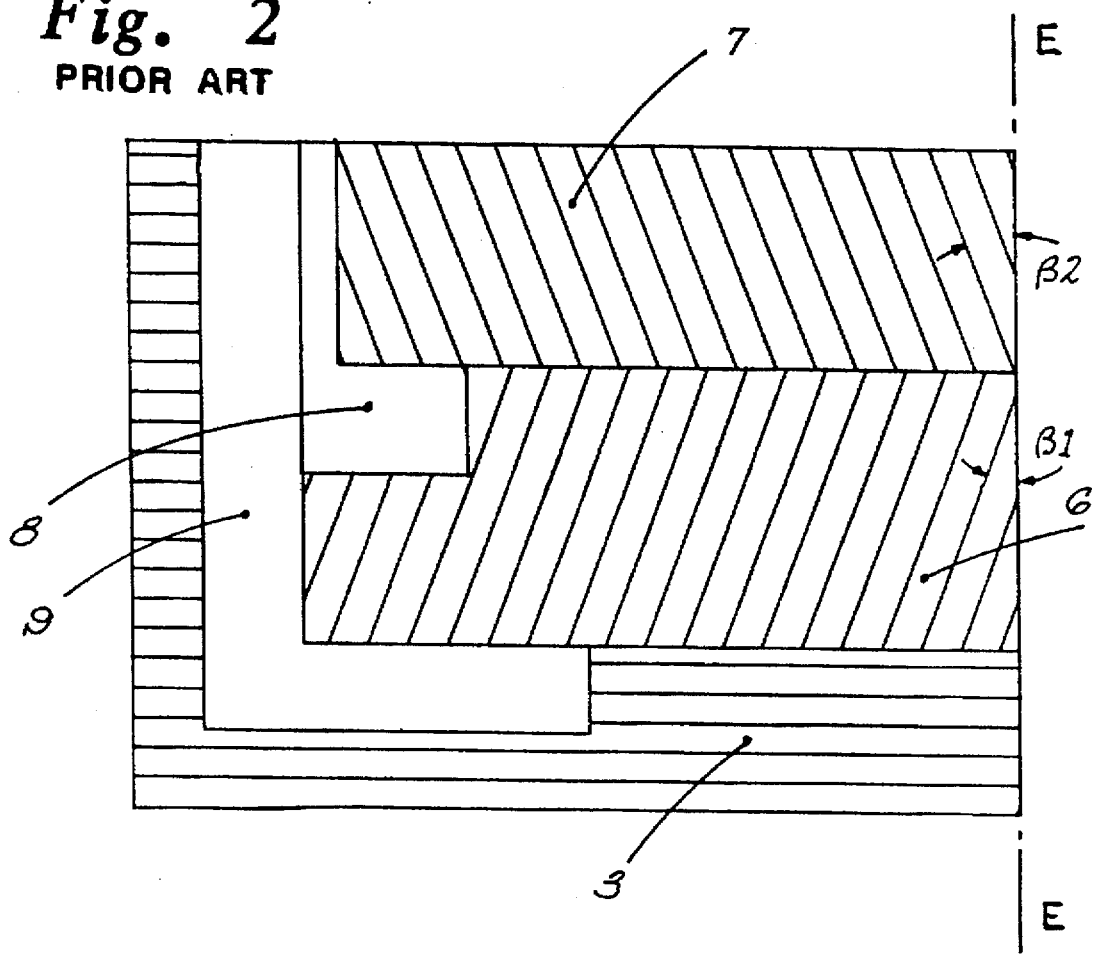
FIG. 2 is a developed sectional view of the belt package and carcass reinforcement of FIG. 1.

The developed sectional view of the belt reinforcement package, protective rubber and carcass for the conventional tire 1 is shown in FIG. 2. The cords or cables are shown in a widely spaced relationship for clarity in disclosing the relationship of the cables in the belt plies and carcass. The tire is symmetrical about the equatorial plane E—E.

The most radially inward carcass 3 is shown as a single body ply layer, but, multiple layers can also be used in these conventional tires 1. The carcass cords are approximately 90 degrees to the equatorial plane E—E & are usually textile cords in the passenger car tire. The standard two belt reinforcement package has a first ply 6 radially inward from a second ply 7. The belt cords can be either textile cords or metallic cables, with cables being the most common reinforcement to obtain adequate strength and durability at a reasonable tire weight. The rubber skim material thickness covering metallic cords in the belt plies is nominally 0.30 to 0.60 millimeters. The angle $\beta1$ of the cords of the first ply 6 with respect to the equatorial plane E—E is opposed to the angle $\beta2$ of the cords of the second ply 7. The angles $\beta1$ and $\beta2$ are usually equal and opposite, and vary between approximately 18 and 30 degrees for the two-belt conventional tire 1. The belt angle $\beta2$ of the most radially outward second ply 7 influences the magnitude of the ply steer torque on a free rolling conventional tire 1.

The intra-ply wedge 8 is added between the belt plies 6 and 7 to improve tire endurance by reducing the influence of high belt edge shearing forces and inter-ply shear stresses.

The shoulder wedge 9 is added for improved stiffness at the shoulders and to help transition the forces between the carcass and the belt package.

Figure 3:
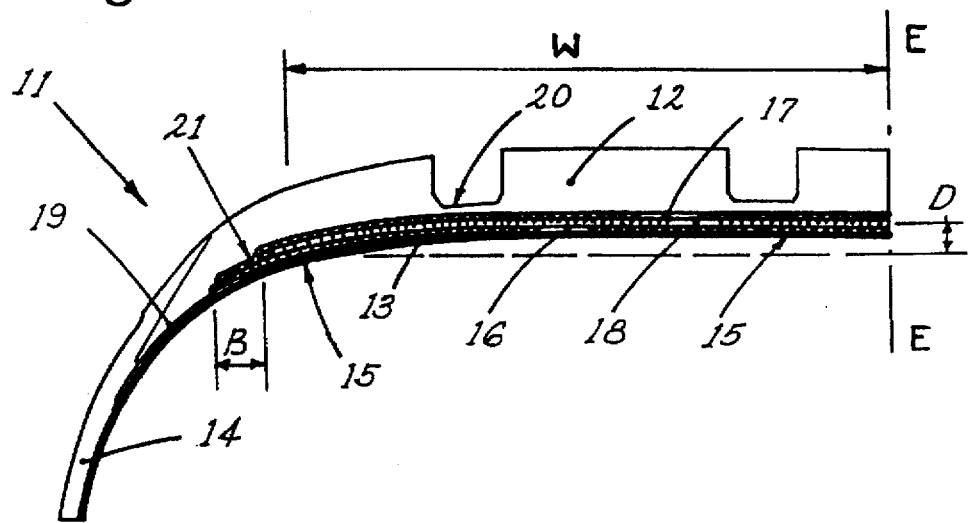
FIG. 3 is a sectional view showing the crown portion of a tire having a three ply belt reinforcement package as per the preferred embodiment of this invention.

The preferred embodiment of this invention is the three-belt tire 11 of FIG. 3, being symmetrical about the equatorial plane E—E. Tire components shown comprise a tread 12, a carcass 13, one sidewall 14, an impervious liner 15, a belt reinforcement package having three crown reinforcing plies 16, 17 and 18 and one shoulder wedge 19. Improvements in the bead areas (not shown) are not a part of the scope of this invention. The most radially inward first ply 16 of the belt reinforcement package is essentially identical to the most radially outward third ply 17, including the angle of the belts as discussed below. The second ply 18 is interposed between the first and second plies 16 and 17. The axial width of said second ply 18 is in a range of approximately 95 to 105 percent of the axial width of said tread in rolling contact with the surface; for nominal design conditions specified by the Tire and Rim Association, Inc. for each tire size and use. Half this width is shown as dimension W in FIG. 3. The first and third plies 16 and 17 have a second width extending beyond the second ply 18 a distance B in a range of approximately 5 to 16 millimeters on each edge. The third ply edge 21 is in contact with the first ply 16 and functions as a edge cover strip for the second ply 18. This permits the suppression of any intra-ply wedge used in the conventional tire 1. A shoulder wedge 19 provides the same protection and function in the three-belt tire 11 as in the conventional tire 1. This shoulder wedge 19 is discontinued in the central portion of the crown for a width of approximately 50 percent of the tread contact width 2×W and has a thickness in a range of approximately 0.5 to 0.8 millimeters.

The distance between the bottom of a tread groove 20 and the belt package being a second rubber portion has been reduced in this three-belt tire 11 and has a thickness in a range of approximately 1.0 to 2.0 millimeters. This is made possible by the use of the corrosion resistant cord materials for the belt package as disclosed herein.

Figure 4:
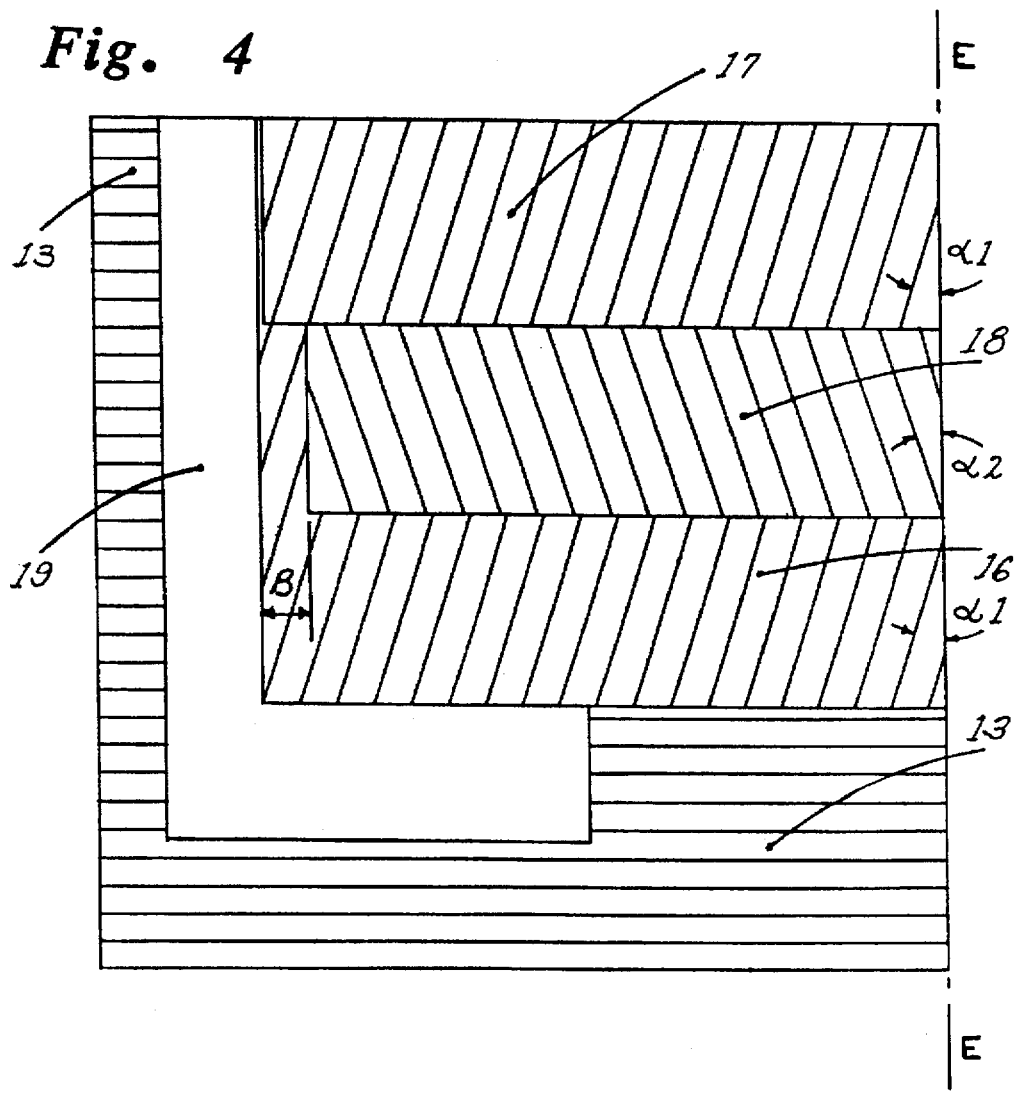
FIG. 4 is a developed sectional view of the belt package and carcass reinforcement of FIG. 3.

The developed sectional view of the belt reinforcement package, protection rubber and carcass for the preferred three-ply tire 11 is shown in FIG. 4. The cords are shown in a widely spaced relationship for clarity in disclosing the relationship of the cables in the belt plies and carcass.

The tire is symmetrical about the equatorial plane E—E. The most radially inward component is the carcass 13, which is shown as a single body ply, however, multiple plies are also within the scope of this invention. The cords of the carcass are approximately 90 degrees to the equatorial plane E—E (radial) and are multifilament cords from a family of material including rayon, polyamide and polyester. Monofilament cords can also be used in the carcass 13, but this is not the preferred materials for this embodiment.

The three-belt tire's belt reinforcement package has first and third plies 16 & 17 approximately identical in construction and materials in the green state. The cord materials of this preferred embodiment is a polyamide (nylon) monofilament with a decitex in a range of approximately 4000 to 6000 grams per 10000 meters. This "obround" shaped monofilament cord is superior to the multifilament cord in its resistance to penetration by foreign objects. The ply strength for the first and third plies 6 and 17 are quoted in the summary at 1.5 and 3.0 percent elongation (unit strain). These two strain values are required to define a cord having a nonlinear unit strain vs. ply strength relationship as shown in FIG. 6. The cord materials of plies one and three are, therefore, defined by a simplified bi-linear curve. Ply strength is defined in the art as the cord strength times the cord end-count, and is expressed herein as decaNewtons per centimeter. Ply strength has also been referred to by those skilled in the art as stiffness per unit width (or force per unit width) and given by the equation $$\frac{dF}{W} = \text{Stiffness per unit width}$$
$$= \text{ply strength.}$$

The relationship of ply modulus (E) to ply strength is given by $$\frac{dF}{W} \times \frac{L}{dL} = E \times t$$

where $$\text{``}\frac{dL}{L}\text{''}$$

is the unit strain and "t" is the ply thickness. This representation of the physical properties of belt plies permits the use of materials disclosed and claimed in this invention without a retirement for a physical relationship for the relative modulus between the various plies.

The third ply 17 can then protect the second ply 18, which can have a metallic cable subject to corrosion. The nylon monofilament cords do not require a thick skim rubber, so first and third plies 16 & 17 have a rubber skim thickness covering the cords on each of the top and bottom surfaces in a range of approximately 0.10 to 0.25 millimeters and a ply strength as quoted in the summary. The first belt angle $\alpha 1$ with respect to the equatorial plane E—E is the same for belt plies 16 and 17 and is in a range of approximately +15 to +20 degrees for the preferred embodiment illustrated in FIGS. 3 and 4.

The second ply 18 of the belt package of FIG. 4 can have as reinforcement metallic cables, textile multifilament cords or monofilament material, provided the linear ply strength value quoted in the summary at 1.5 percent elongation is obtained. The second belt angle $\alpha 2$ is opposed to the first belt angle $\alpha 1$ and is in a range of values of approximately −15 to −25 degrees with respect to the equatorial plane E—E. The second belt angle $\alpha 2$ of the second ply 18 can be varied to give optimum balance of parameters for a given tire design and dimension. The crown profile radius as well as the growth of the tire during inflation and centrifugation are strongly dependent on the second angle $\alpha 2$. A tire crown profile radius in the range of approximately 450 to 3000 millimeters is used for this preferred embodiment.

At an optimum second ply angle $\alpha 2$, experimental investigations have shown the three-belt tire 11 footprint area to have near zero ply steer, a more uniform pressure distribution and uniform longitudinal and transverse tractive stresses. The footprint is controlled by limiting the radial droop D of the edge of said second ply 18 with respect to its central area to be in a range of approximately 1 to 4 percent of its width. The inventors prophesy improved wear, wet and dry traction and vehicle handling as a result of their experimental work. The preferred reinforcement of said second ply 18 is a metallic cable with a brass coating comprising approximately standard construction & including a skim rubber on each of the top and bottom surfaces of the same material used for the steel belts of a conventional tire, but a thickness as specified for the second and third plies 16 & 17. The shoulder wedge 19 separates the belt package from the carcass 13 and extends laterally at the shoulder area, but is discontinued in the central portion of the crown. The thickness of this conventional rubber shoulder wedge is in a range of approximately 0.5 to 0.8 millimeters and tapers to form a wedge at its central most edge.

Figure 5:
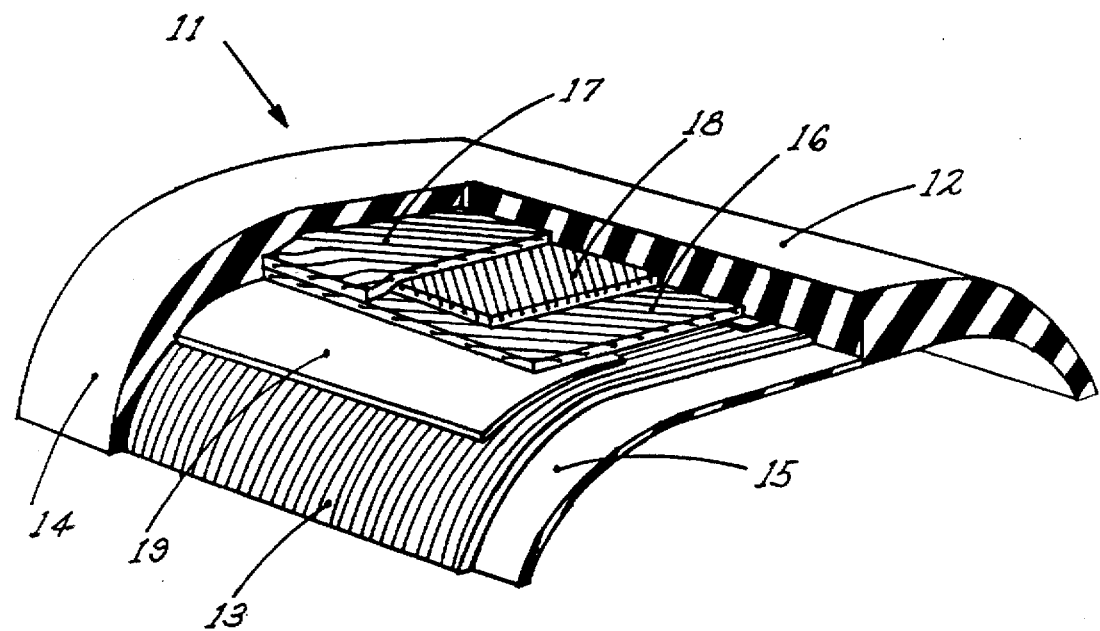
FIG. 5 is a perspective view of a section of a tire crown portion partially broken away to reveal the internal structure and details of the preferred embodiment of the invention.

The perspective view of FIG. 5 illustrates the interrelationship of the various components that comprise the preferred three-belt tire 11. The tread 12 sculpture is not shown, as various designs are possible within the scope of this invention. The carcass 13 is shown as one body ply, however, multiple body plies are within the scope of this invention.. The first ply 16 and the third ply 17 of the belt reinforcing package are essentially the same including the cord angles of each. The third ply 17 covers the edge of the second ply 18 of this belt package providing belt edge protection for this second ply 18. The shoulder wedge 19 of rubber material on each lateral shoulder is placed between the carcass and the first ply 16 and extends around the shoulder area to the sidewall 14 area, but is truncated in the center section of the tire. The liner 15 is a rubber material relatively impervious to air and of a conventional design. The cords are shown spaced apart for clarity in illustrating their relative orientation and location.

The claimed invention has shown potential advantages over a conventional two steel belt design with respect to high speed performance and improved rolling resistance for standard drum and twin roll methods. This invention shows improved corrosion resistance and improved resistance to belt edge separations in severe operating conditions compared to the conventional two belt design. This invention allows for an easy adjustment for optimum performance, with a given mold design, by a small adjustment in the angle of the second ply. This invention also allows a significant reduction in the ply steer of the tire by the adjustment in the angle of the second ply. This invention has the potential for a significant cost and weight reduction of the tire by the reduction in the amount of steel in the tire in addition to reduced rubber thickness required in the reinforcing plies and the undertread area of the tire above the reinforcing belt package. This invention offers the potential for improved wear, particularly for shoulder wear in hard cornering, with respect to the two steel belt tire as a result of better distributions of the forces and optimization of the tire footprint. This invention has the potential for improved tire comfort with respect to the two steel belt tire through the reduction of steel and optimization of the tire profile made possible by adjustments of the reinforcing belt package. This invention offers a potential for ease of production by the suppression of miscellaneous belt edge protection materials required for a two steel belt configuration, and the fact that belts one and three can be posed at the same post since they are identical.

Experimental Evidence

The three-belt tire of the preferred embodiment has been compared to a conventional state-of-the-art two steel belt tire of the same T & RA rating presently offered for sale. Various experimental tests were performed and the results are summarized in the following discussion.

The three-belt tire consistently had a high speed limit result in excess of 240 kilometers per hour. Average high speed limits were approximately 15 percent higher for the three-belt tire. Rolling resistance on the meter roadwheel show a 2 to 5 percent improvement, and on the twin-rolls a 4 to 5 percent improvement was recorded by the three-belt tire. The "three-belt tire" ply steer torque that preloads the steering and suspension system was drastically reduced to a value ⅙ to ⅒ of the value recorded for the conventional tire. Finally, an overall reduction in tire weight by approximately 10 percent is obtained by using three-belt tire of this invention.

Weight and performance test data was obtained for a P185/65R14 three-belt tire of this invention comprising the following belt reinforcing package:

|  | Material | Pace cords/cm | Skim Thickness/mm | Ply Strength daN/cm |
|---|---|---|---|---|
| PLY 1 & 3 | HYTEN 444 | 6.8 | 0.25 | 238 |
| PLY 2 | STEEL 4 × .28 mm | 6.25 | 0.65 | 394 |

The belt cord angles for ply one and ply three were +18 degrees and the belt cord angle for ply two was −22 degrees. The Modulus of Elasticity of plies one and three is 1472 MegaPascals and the modulus of elasticity of ply 2 is a much larger value being 22496 MegaPascals. Weight and performance test data was also obtained for a standard T & RA P185/65R14 two steel belt tire having the following belt reinforcing package:

|  | Material | Pace cords/cm | Skim Thickness/mm | Ply Strength daN/cm |
|---|---|---|---|---|
| INNERMOST PLY 1 | STEEL 4 × 0.28 mm | 6.25 | 0.65 | 394 |
| OUTERMOST PLY 2 | STEEL 4 × 0.28 mm | 6.25 | 0.65 | 394 |

The belt cord angles of this standard tire were typical at a value +21 degrees for ply one and −21 degrees for ply two. A symmetrical modulus of elasticity of 22496 MegaPascals for both plies is used for this standard tire. The test data is compared in the table of relative values shown below. Values greater than 100 indicate improvements in this respective parameter.

| PARAMETER | THREE-BELT TIRE | TWO STEEL BELT TIRE |
|---|---|---|
| Weight | 107 | 100 |
| Ply Steer | 2800 | 100 |
| High Speed Limit | 114 | 100 |
| Rolling Resistance | 104 | 100 |
| Ride Comfort | 115 | 100 |

It will be understood that similar ply arrangements and the use of other cord materials can be developed for the first and third plies of the three-belt reinforcement package disclosed in the specific examples given herein without departing from the invention. For example, polyester and other polymeric multifilament textile cords can be used provided their ply strength meets the criteria established herein. Accordingly, the exemplary forms of the invention described above should be considered as illustrative and not as limiting the invention as defined in the following claims.

What is claimed is:

1. A radial pneumatic tire having a carcass of at least one ply, a tread, two sidewalls extending from the edges of said tread, a respective bead at the radially inner edges of each of said sidewalls and a crown belt package adjacent both said tread and said carcass comprising three crown reinforcing plies with first and third plies each having textile multifilament or polymeric monofilament reinforcing members substantially parallel and disposed at a first angle in the range of approximately +15 to +20 degrees with respect to an equatorial plane of said tire, said first and third plies having essentially identical first angles, materials, and uncured widths, and a second ply adjacent both said first and third plies having second ply reinforcing members selected from either metallic cables, textile multifilament cords or monofilament material, and inclined oppositely to said textile multifilament or polymeric monofilament reinforcing members of said first and third plies and disposed at a second angle in the range of approximately −15 to −25 degrees with respect to the equatorial plane of said tire, said second ply of said crown reinforcing plies being centered relative to the equatorial plane and having a first width in a range of approximately 95 to 105 percent of an axial width of said tread in contact with a ground surface during rolling and said first and third plies being centered relative to said equatorial plane and having a second width extending axially beyond each edge of said second ply a distance of approximately 5 to 16 millimeters, wherein axial edge portions of the first and third plies have direct contact one with the other beyond each axial edge portion of said second ply resulting in the absence of any auxiliary belt edge protection plies;

wherein said first and third plies have a ply strength at 1.5 percent elongation of at least 12 daN/cm and no greater than 50 daN/cm and a ply strength at 3.0 percent elongation of at least 18 daN/cm and no greater than 70 daN/cm, and wherein said second ply has a ply strength at 1.5 percent elongation of at least 30 daN/cm with no upper limit, ply strength being defined at $ET/(L/dL)$, where E=ply modulus, T=ply thickness, and $(L/dL)$= unit strain given by percent elongation/100; wherein said crown belt package further includes a first rubber portion being a shoulder wedge located adjacent said carcass, said first rubber portion having a thickness taken in a radial direction in the range of approximately 0.5 to 0.8 millimeter;

wherein said tread is defined by a tread rubber portion located radially outwardly of the crown belt package and having at least one groove therein, said tread rubber portion having a second rubber portion between the crown belt package and the radially innermost surface of said at least one groove with a thickness in the radial direction in the range of approximately 1.0 to 2.0 millimeters;

wherein said crown belt package further includes a rubber skim covering each of the top and bottom surface of the textile multifilament or polymeric monofilament reinforcing members and the second ply reinforcing members in said first, second, and third plies, said rubber skim having a radial thickness in the range of approximately 0.10 to 0.25 millimeter.

2. The tire according to claim 1 wherein said textile multifilament or polymeric monofilament reinforcing members are polyamide monofilaments having an obround cross-section taken in a plane extending transversely to the direction in which said monofilaments extend.

* * * * *